(12) United States Patent
Prinz et al.

(10) Patent No.: US 12,090,689 B2
(45) Date of Patent: Sep. 17, 2024

(54) METHOD OF MAKING A FLAT BUILDING COMPONENT

(71) Applicants: Maximilian Prinz, Passau (DE); Tobias Schmid, Neureichenau (DE)

(72) Inventors: Maximilian Prinz, Passau (DE); Tobias Schmid, Neureichenau (DE)

(73) Assignee: PARAT TECHNOLOGY GROUP GMBH, Neureichenau (DE)

( * ) Notice: Subject to any disclaimer, the term of this patent is extended or adjusted under 35 U.S.C. 154(b) by 249 days.

(21) Appl. No.: 16/429,378

(22) Filed: Jun. 3, 2019

(65) Prior Publication Data
US 2020/0094449 A1 Mar. 26, 2020

(30) Foreign Application Priority Data
Sep. 26, 2018 (DE) .......................... 102018123703.0

(51) Int. Cl.
| | |
|---|---|
| B29C 44/44 | (2006.01) |
| B29C 44/08 | (2006.01) |
| B29C 44/12 | (2006.01) |
| B29C 44/14 | (2006.01) |
| B29C 44/34 | (2006.01) |
| B29C 44/56 | (2006.01) |
| B29C 51/08 | (2006.01) |
| B29K 105/04 | (2006.01) |
| B29K 105/08 | (2006.01) |
| B29L 31/30 | (2006.01) |

(52) U.S. Cl.
CPC ............ *B29C 44/445* (2013.01); *B29C 44/08* (2013.01); *B29C 44/083* (2013.01); *B29C 44/1285* (2013.01); *B29C 44/14* (2013.01); *B29C 44/3415* (2013.01); *B29C 44/5681* (2013.01); *B29C 51/08* (2013.01); *B29K 2105/048* (2013.01); *B29K 2105/08* (2013.01); *B29L 2031/3005* (2013.01)

(58) Field of Classification Search
CPC .................................................... B29C 44/445
See application file for complete search history.

(56) References Cited

U.S. PATENT DOCUMENTS

| | | | | |
|---|---|---|---|---|
| 4,260,571 A | * | 4/1981 | Ritter .................... | B29C 44/445 264/53 |
| 4,424,177 A | * | 1/1984 | Immel .................. | B29C 44/445 264/415 |
| 4,519,964 A | * | 5/1985 | Rosen .................... | B29C 41/04 264/45.4 |

(Continued)

FOREIGN PATENT DOCUMENTS

| | | |
|---|---|---|
| CN | 207736616 U | 8/2018 |
| DE | 3842846 A1 | 6/1990 |

(Continued)

*Primary Examiner* — Benjamin A Schiffman
(74) *Attorney, Agent, or Firm* — Andrew Wilford

(57) ABSTRACT

The invention relates to a method of making a thin construction element (10) in sandwich lightweight construction having a high-quality surface (26). Including the steps of deep drawing a substrate film, placing the deep-drawn film into a cavity of a die, introducing partially expanded particles onto the substrate, heating to completely expanded the particle foam, curing the expanded particle foam, and opening the die to remove the molded article.

8 Claims, 4 Drawing Sheets

(56) References Cited

U.S. PATENT DOCUMENTS

| | | | |
|---|---|---|---|
| 4,756,859 A * | 7/1988 | Cretti | B29C 44/445 |
| | | | 264/45.4 |
| 5,078,932 A * | 1/1992 | Bissinger | B22C 7/023 |
| | | | 264/45.4 |
| 5,585,119 A | 12/1996 | Petersen et al. | |
| 6,033,770 A | 3/2000 | Matsuki et al. | |
| 6,261,489 B1 | 7/2001 | Matsuki et al. | |
| 6,492,000 B1 | 12/2002 | Matsuki et al. | |
| 7,358,280 B2 * | 4/2008 | Berghmans | B29C 44/3453 |
| | | | 521/56 |
| 7,416,461 B2 * | 8/2008 | Yeh | B32B 3/04 |
| | | | 441/65 |
| 10,919,198 B2 * | 2/2021 | Kraatz | B29C 44/14 |
| 2006/0105650 A1 * | 5/2006 | Yeh | B63B 32/57 |
| | | | 441/65 |
| 2016/0318220 A1 * | 11/2016 | Jaschke | B62D 29/002 |
| 2017/0334106 A1 | 11/2017 | Sameshima et al. | |
| 2020/0023565 A1 * | 1/2020 | Atzinger | B60L 8/003 |
| 2020/0324445 A1 * | 10/2020 | Prinz | B29C 44/14 |

FOREIGN PATENT DOCUMENTS

| | | | | |
|---|---|---|---|---|
| DE | 102012017698 A | 12/2013 | | |
| DE | 102013005523 A | 12/2013 | | |
| DE | 102013008592 A | 12/2013 | | |
| DE | 102013008364 A | 8/2014 | | |
| DE | 102013018694 A | 5/2016 | | |
| DE | 102015111052 A | 1/2017 | | |
| DE | 102016112290 A | 11/2018 | | |
| DE | 102017109953 A | 11/2018 | | |
| DE | 102020106927 A1 * | 10/2020 | | B29C 44/445 |
| EP | 0152655 A1 | 1/1984 | | |
| EP | 0477476 A2 | 6/1991 | | |
| JP | 59201826 A | 11/1984 | | |

* cited by examiner

METHOD OF MAKING A FLAT BUILDING COMPONENT

BACKGROUND OF THE INVENTION

The invention relates to a method of making a thin construction element in sandwich lightweight construction having a high-quality surface.

Such methods have been developed by the applicant for decades and performed on a large scale.

For example only, reference is made to the following German patent applications of the applicant:

DE 10 2018 117 337, DE 10 2017 109 953, DE 10 2016 112 290, DE 10 2013 018 694, DE 10 2013 008 592, DE 10 2013 005 523 15, DE 10 2013 008 364, DE 10 2015 111 052 and DE 10 2012 017 698, the content of which is hereby included in the content of the present patent application to avoid repetition.

The methods predominantly applied by the applicant so far to produce such a thin construction element comprise, in particular, compounds of thermoplastic deep-drawn films with polyurethane foam masses.

On this basis, the object of this invention is to provide a method for making a thin construction element that meets the requirements for low weight and a high rigidity and can be manufactured inexpensively.

The invention achieves this object with the features of claim 1.

BRIEF SUMMARY OF THE INVENTION

The principle of the invention initially consists in using an expandable particle foam instead of the previously used polyurethane two-component foams.

Suitable expandable particle foams, for example, particle foams of EPS, EPE and EPP are considered. These are particle foams that can have densities in the fully or finally manufactured expanded-filled and cured state in the range of typically 15 kg/m$^3$ to 80 kg/m$^3$.

According to the invention, a substrate film is first provided. It can be, for example, a deep-drawable film, for example, of ABS or PMMA. This can, for example, have a wall thickness between 0.2 and 13 mm. The film can be deep-drawn, for example, in a first die. However, the substrate used can also be formed by a thin skin, a thin film, or another thin material. The substrate does not have to be deep-drawn.

According to the invention, the substrate is arranged in a lower die part. The lower die part in this case has in particular a cavity for particles, which is explained in more detail later.

The method according to the invention now provides that granular starting material is provided in the form of loose particles of an expandable particle foam. Those materials that are known as expandable particle foams are considered. In particular, expandable particle foams are understood herein as of EPS, EPE, or EPP, or also expandable PEEK. A further definition is given below.

The granular starting material can be provided in the form of small globules or beads or in the form of granular particles of other regular or even irregular shape and geometry. The starting material is in particular pourable.

The particles are loosely present in the granular starting material, that is, in particular, they are not yet firmly bonded together.

According to the invention, the step of only partly expanding the particles now takes place. The only partly expanding means that the particles are not completely expanded. For example, it can be provided according to the invention that, based on an expanding or expansion process from 0 to 100%, starting from the volume of the particles of the starting material up to the volume of the particles in the finally expanded state, only partly expanding takes place between 30 and 95%. The term only partly expanding includes, in particular, embodiments of the invention in which at least the step of an additional expanding the particles can still be performed, leading to a finally expanded state of the particles.

The only partly expanding step takes place particularly, but not necessarily, at a location remote from the lower die part in which the substrate is arranged. Further advantageously, the only partly expanding the particles can be performed in an oven, in particular in an infrared oven.

According to a further step of the method according to the invention, provision can be made for the partly expanded particles to be introduced into the lower die part. The transport of the partly expanded particles can be performed, for example, temporally immediately after performing the step of the only partly expanding the particles. However, it can also be performed considerably later in time after performing the step of the only partly expanding the particles.

An introduction and/or arrangement or positioning the partly expanded particles in the lower die part can be done by machine, automatically, or manually.

According to the invention, the die is now closed in particular. For this purpose, for example, an upper die part can travel against the lower die part and close a cavity or accommodation space for the partly expanded particles, and for the substrate located in the lower die part.

Furthermore, according to the invention, the die is heated. The invention also encompasses when the die is constantly maintained at a constant temperature or at a temperature within a predetermined temperature range.

According to the invention, a final expanding of the previously partly expanded particles to a completely expanded particle foam then takes place. The particles now expand to their maximum extent or to their maximum volume, and bake or sinter together, so to speak. In this case, the particle foam mass bonds with the substrate at the same time. The activation of the residual expanding process takes place via the mold temperature. The invention also comprises when, additionally or alternatively, other activating agents are used for activating and performing the residual expanding process of the particles, that is, for the expanding process of the already partly expanded particles up to a finally expanded state of the particles.

According to the invention, the particle foam mass is then allowed to cure. As a result of this curing process, the particle foam mass shrinks into a permanent solid combination with the substrate.

The invention also comprises when the substrate is provided with a corresponding chemical, for example, in the manner of a primer, on its inner side facing the particle foam mass before the introduction of the partly expanded particles in the lower die part, in order to optimize the bonding between the substrate and the particle foam mass or the shrinking of the bonding between the substrate and the particle foam mass.

After the particle foam mass has been allowed to cure, the die can be opened, and the molded article thus formed removed. The molded article thus formed represents the construction element to be manufactured according to the invention, or can mature to such a construction element by subsequent processing steps.

Definition of expandable particle foam:

For example, the following materials are considered as expandable particle foams in the sense of the present patent application:

The abbreviation EPS denotes expandable polystyrene. This is known, for example, under the trade name Styrofoam, and can, for example, be obtained from the company Metz EPS-Hartschaumzuschnitte in 74376 Gemmrigheim.

Expandable polyethylenes (EPE) are also considered to be particle foam in the sense of the present patent application. Finally, expandable polypropylenes (EPP) are also considered to be well suited for the purposes of the invention.

In particular, the term particle foam in the sense of the present patent application includes thermoplastic particle foams. These can have, as a starting material, granules, in particular also microgranules, for example, having diameters of the particles in the order of magnitude of between 0.1 and 5 mm, more preferably particles having a diameter of approximately 1 mm.

Propellants are preferably arranged in the granular starting material particles of the particle foam. These can be activated in order to trigger the pre-expanding process thermally and/or by chemicals, for example, by the action of water vapor.

The process of residual expanding, that is, the further expanding of already pre-expanded particles into finally expanded particles, is also referred to as sintering in the sense of the present patent application.

For example, pentane, which is polymerized into the granular particles, can be considered as a propellant for polystyrene particle foam particles. As soon as the particles are exposed to temperatures over 100° C., the propellant can vaporize, thereby inflating the thermoplastic base material into polystyrene foam particles.

According to the invention, the second expanding stage can be performed in the lower die part, wherein the die temperature is selected such that the propellant can finally evaporate and foam-fill the particles.

In addition to EPS (extrudable polystyrene), XPS is also considered suitable for the invention.

For example, the company Schaumaplast GmbH & Co. KG in 68799 Reilingen can be considered as a source of supply for expandable polypropylene EPP or XPS.

Particle foams for use with the invention can also be formed by expandable co-polymers. Such materials are obtainable, for example, under the trade name Grupor from Kunststoffwerk Katzbach GmbH & Co. KG in 93413 Cham.

Expandable PEEK (polyether ether ketone) is also considered as a starting material of the particle foam that can be used in the context of the invention. This is available, for example, under the trade names Gatone or Victrex.

The method according to the invention is used to produce a construction element having a high-quality surface. A high-quality surface, for example, can be configured, particularly resilient, for example, be particularly impact-resistant, and further be suitable in particular for outdoor applications. In particular, a high-quality surface can have properties as required in so-called class A surfaces.

The invention relates to a method of making a thin construction element. The term thin means that the construction element extends substantially longer along a surface in the x and y directions than in a z direction perpendicular thereto. The surface can be configured flat or curved in space, also multiply curved, and take any spatial form.

According to an advantageous embodiment of the invention, the substrate is formed by a deep-drawn film. This allows a recourse to conventional constituents of a construction element, which are already extensively tested, and enable in particular the provision of a high-quality surface for the component.

According to a further advantageous embodiment of the invention, the performance of step k) is provided: applying a cover layer on the side facing away from the substrate of the particle foam mass. Such a cover layer can be, for example, an inner decor layer, for example, a wall panel, in particular, a plastic layer.

In the event that the manufactured construction element, for example, forms a wall or a wall section of a caravan or a caravan trailer, the decorative layer, for example, can be a typical interior trim surface of such a caravan in a conventional manner.

According to a further advantageous embodiment of the invention, the method according to the invention comprises the following step:

l) processing the molded article into a construction element.

Various processing methods are considered processing steps. This includes, for example, if necessary, a separation or sectioning of parts or regions of the molded article, possibly also a separation or sectioning of sections of the substrate. This also includes, for example, a step of cleaning, and/or a step of a surface treatment, in particular on the outside of the substrate, for example, a roughening or polishing or smoothing the surface, possibly also applying an additional layer or film, for example, an additional functional layer.

The invention also comprises when the side of the cured foam particle mass facing away from the substrate is processed, for example, bonded or acted upon with an additional skin or an additional material or a film, for example, sprayed, laminated, painted, riveted, screwed or glued with a further element.

According to a further advantageous embodiment of the invention, the film has a wall thickness between 0.2 mm and 13 mm. This embodiment of the invention also allows for recourse to conventional films that have been proven in a variety of composites, and whose deep-drawing properties and surface properties are well known and researched.

According to a further advantageous embodiment of the invention, the cured-particle foam mass comprises a wall thickness between 1 cm and 30 cm. The wall thickness of the cured-particle foam mass is calculated and designed as a function of the required strength of the manufactured construction element. Despite the relatively large wall thicknesses, the finished construction element may only have a very low weight.

According to a further advantageous embodiment of the invention, the construction element is configured as a vehicle part for a motor vehicle, or for a commercial vehicle, or for a trailer, and is, for example, an interior fitting part, or a cargo compartment cover, or a cladding part, or an engine hood, or a roof element, or a roof segment, or a vehicle wall, or a vehicle wall element.

According to a further advantageous embodiment of the invention, the granular starting material comprises expandable EPS, expandable EPP or expandable PEEK. These are all materials that are expandable, that is, expandable, and that according to the invention are suitable initially to be expanded or expanded only partly expanding in order to subsequently undergo a further step of further expanding or final expansion in a die.

According to a further advantageous embodiment of the invention, the method comprises step m) that is performed before step h):

m) positioning of reinforcing elements, in particular in the manner of tie rods, for example, in the manner of tapes, in the lower die part, wherein after the introduction of the partly expanded particles in the lower die part, the particles surround the reinforcing elements.

According to this advantageous embodiment of the invention, the finally expanded particle foam mass is reinforced or stiffened by reinforcing elements. These are in particular formed so that they can transmit tensile forces in a direction transverse to the planar extent of the construction element. The rigidity of the construction element can be increased by this. The invention also comprises when the reinforcing elements extend along the direction of extent of the thin construction element. In this case, for example, planar structures such as mats, scrims, knitted fabrics, etc. of reinforcing fibers, for example, of glass fibers, carbon fibers, aramid fibers, basalt fibers or other suitable reinforcing fibers, are inserted into the lower die part before filling in the cavity with partly expanded particles.

The invention relates, according to a further aspect, to a thin construction element according to claim 10.

The invention has for its object to provide a construction element that has a high strength and load capacity with only a small weight and can be manufactured inexpensively.

The invention achieves this object with the features of claim 10.

To avoid repetition, reference is made to the preceding statements regarding the claims 1 to 9 in an analogous manner with respect to the clarification and explanation of the features of claim 10 and to explain the invention according to claim 10.

Further advantages of the invention are apparent from the non-cited subclaims, and with reference to the following description of the embodiments illustrated in the drawings. Therein:

DETAILED DESCRIPTION OF THE INVENTION

Figure 1:
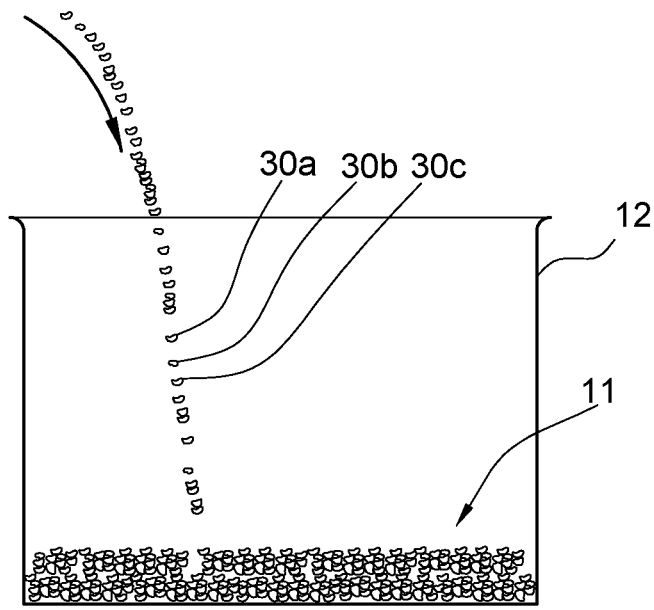
FIG. 1 is a partly sectioned schematic view, an embodiment of an oven in which unexpanded granular starting material is poured in the form of particles of a particle foam.

Embodiments of the invention are described by way of example in the following description of the figures, also with reference to the drawings. For reasons of clarity, identical or comparable parts or elements or regions are also referred to with the same reference numerals, sometimes with the addition of small letters, even if different embodiments are involved.

Features that are described, illustrated or disclosed only in relation to an embodiment can be provided within the scope of the invention in any other embodiment of the invention. Such modified embodiments are comprised by the invention, even if they are not illustrated in the drawings.

All disclosed features are essential to the invention. In the disclosure of the application, the disclosure content of the associated priority documents (copy of the prior application) and the cited documents and the described devices of the prior art are hereby incorporated in full content, also for the purpose of one or more features of the objects disclosed therein or in several claims of the present application. The invention also comprises such modified embodiments, even if they are not illustrated in the drawings.

Embodiments of construction elements that have been manufactured according to the method according to the invention are denoted by 10 in their entirety in FIGS. 8, 9, 10 and 11.

The method for manufacturing such a construction element 10 will be presented in the following, starting from FIG. 1:

As shown in FIG. 1, a container 12 is shown, into which a granulate 11 of a particle foam is poured. The individual granulate particles, which are designated by the reference numerals 30a, 30b, 30c by way of example, are unexpanded, and constitute the starting material for manufacturing a particle foam. The individual materials that can be used according to the method of the invention are specified in detail later.

Figure 2:
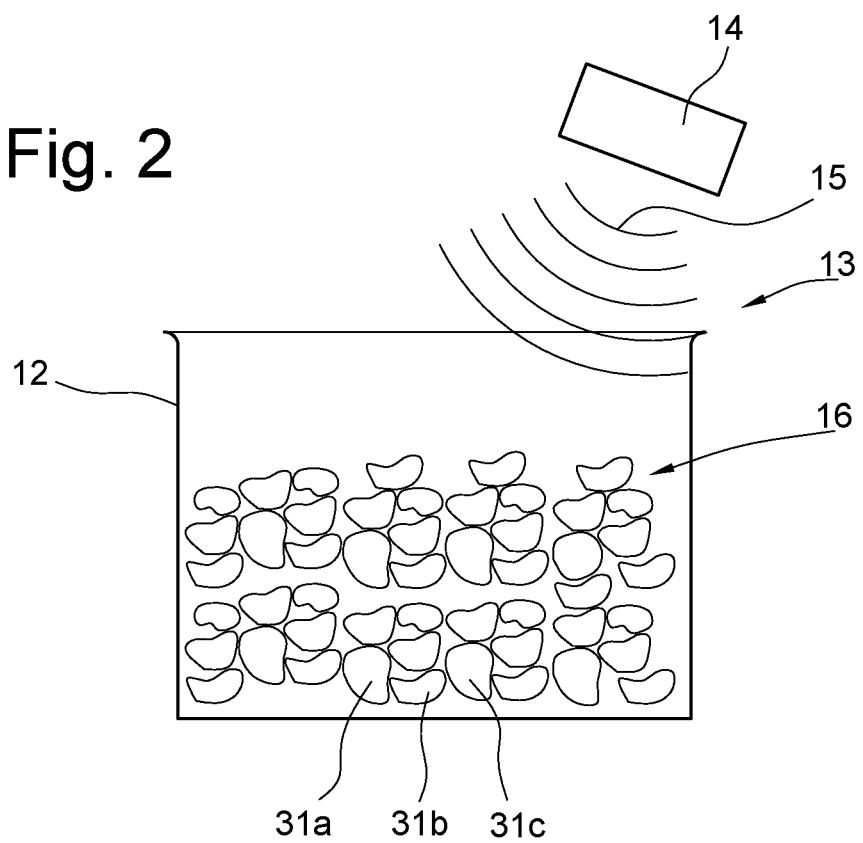
FIG. 2 shows the oven of FIG. 1 with an additionally illustrated infrared radiant heater for converting the previously poured-in particles into a partly expanded state.

As shown in FIG. 2, the container 12 is part of an oven 13, in which the granulate particles 30a, 30b, 30c can be partly expanded:

A heater 14, in particular an infrared heater 14, is provided for this purpose, which introduces a predetermined radiant power using infrared radiation 15 (indicated) into the oven 13 in order to reach a certain temperature or a certain temperature range. The granulate particles 30a, 30b, 30c are exposed in the oven 13 to the influence of temperature for a predetermined time and partly expanded. It can be seen that the individual particles 30a, 30b, 30c of FIG. 1 gain considerably in volume and, according to FIG. 2, mutate into partly expanded particles 31a, 31b, 31c.

It should be noted that the figures are of course not to scale, but that the process of expanding and the volume enlargements are to be illustrated only by way of example.

Figure 5:
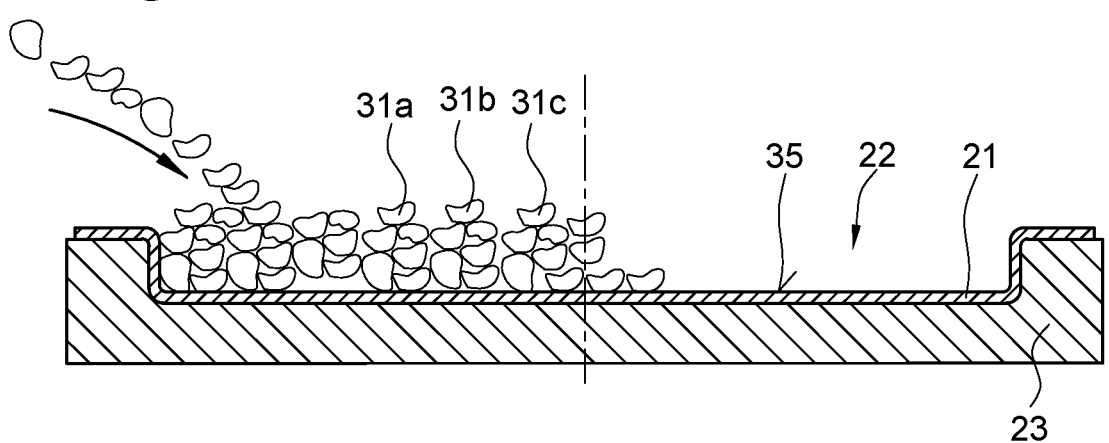
FIG. 5 shows a further lower die part holding the deep-drawn film of FIG. 4, the partly expanded particles of the particle foam according to FIG. 2 being poured into the lower die part.
Figure 6:
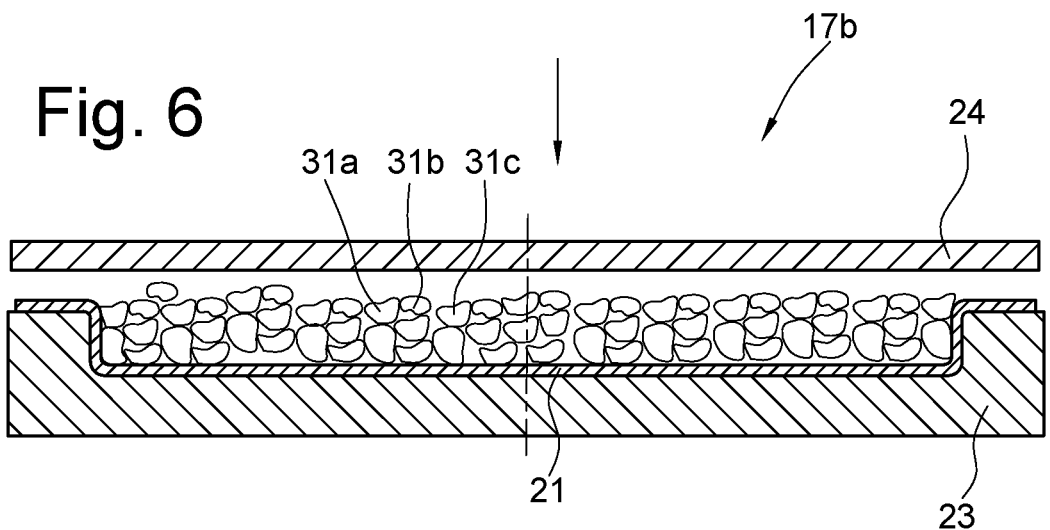
FIG. 6 shows the die of FIG. 5 with an also illustrated upper die part shown just before the die is completely closed.

The partly expanded particles 31a, 31b, 31c are still loose, in particular, not bonded with one another. During the process of only partly expanding according to FIG. 2, additional measures, such as shaking the container 12, stirring, use of chemicals, or introduction of chemicals into the container 12, etc., can be achieved so that the particles 31a, 31b, 31c do not bond with each other or predominantly do not bond with each other, but are still transportable as a loose, free-flowing or at least pourable mass. As shown in FIG. 5, this mass is poured into a lower die part 23 of a die 17b.

Figure 3:
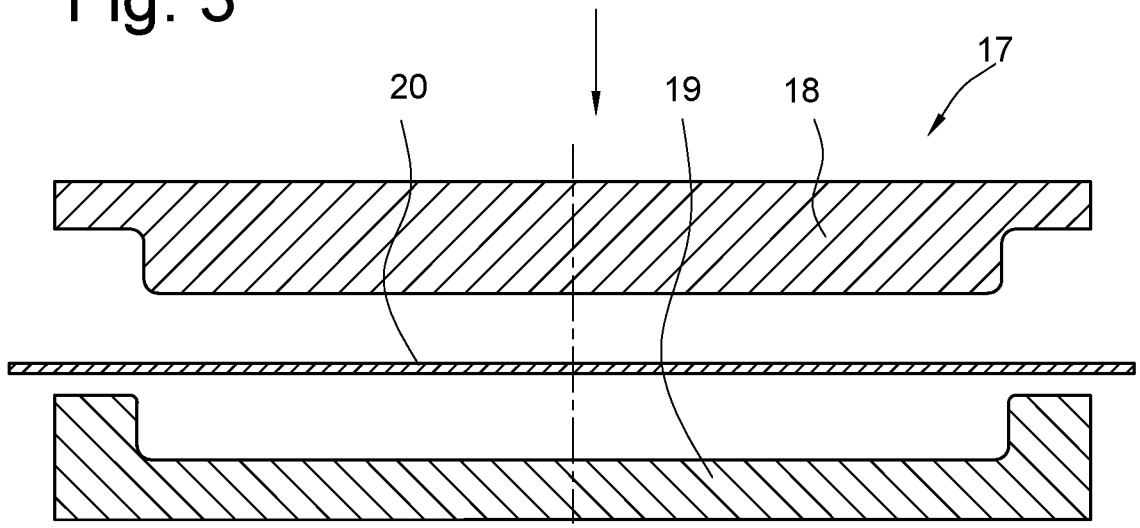
FIG. 3 shows a first die having lower and upper die parts and a film formed as a flat web substrate.
Figure 4:
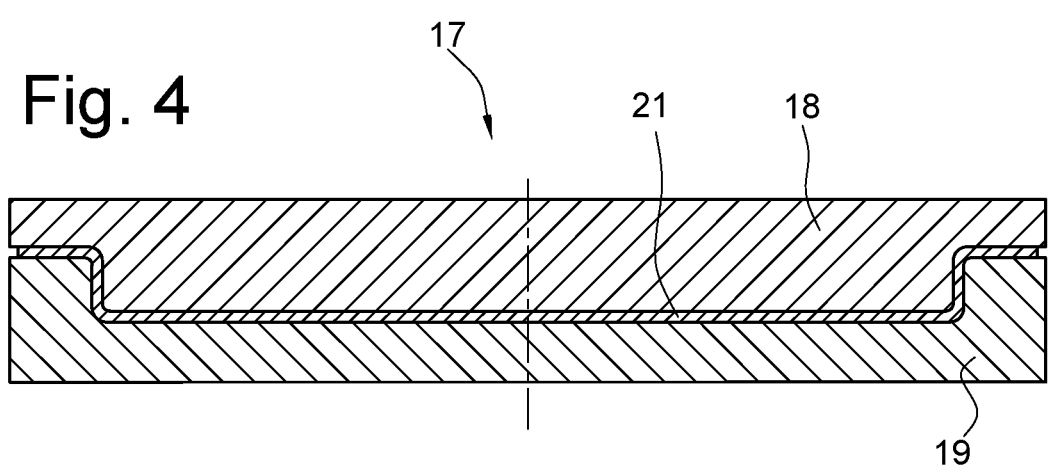
FIG. 4 shows the closed die of FIG. 3 with a deep-drawn film.

First, with reference to FIGS. 3 to 4, the production of substrates 21 are explained:

As shown in FIG. 3, a first die 17 is provided that comprises an upper die part 18 and a lower die part 19. The relevant die parts can be configured in the manner of a die and in the manner of a male mold. In FIG. 3, a film 20 in flat-lying, web-shaped state, that is, an initial state, can be seen. FIG. 3 shows the die in the open state.

As a result of closing the die, the film 20 is deep-drawn from the flat-lying state. Any spatial contour can be applied to the film by the deep-drawing. The deep-drawing process can, although not shown in the figures, be supported in a conventional manner by temperature. For the deep-drawing process, blow molding methods or other forming methods are also considered as an alternative to the embossing/die-cutting operation of the die 17 of FIG. 3, in which the film is heated and brought into its final shape by suction.

After opening the die 17 from the state of FIG. 4, the deep-drawn film 21 can be removed, and be fed to another die 10. Such a second die 17b is shown in FIGS. 5 to 8.

The invention also comprises when the film 21 remains in the lower die part 19 after the deep-drawing process, and only the upper die part is exchanged. In the following it is assumed that, starting from FIG. 5, the deep-drawn film 21 has been brought into another, second lower die part 23 of another die 17b.

As shown in FIG. 5, the pourable or flowable mass of partly expanded particles 31a, 31b, 31c is brought into the lower die part 23 in a cavity 22 that serves for receiving the partly expanded particles 31a, 31b, 31c, and that faces the back side 35 of the deep-drawn film 21. A filling of the second lower die part 23 or the cavity 22 provided for this purpose can be done manually or by machine or with machine assistance until a predetermined volume or predetermined mass of partly expanded particles 31a, 31b, 31c is positioned in the cavity 22 and, in particular, also distributed.

In this case, a holding or extraction device not shown in the figures can be provided that distributes the particles evenly along the cavity 22 in the manner of a feed head.

The die 17b is then closed. For this purpose, an upper die part 24 is moved from a state according to FIG. 6, in which the die 17b is still partly opened, into a closed state. The cavity 22 is now closed on all sides.

Figure 7:
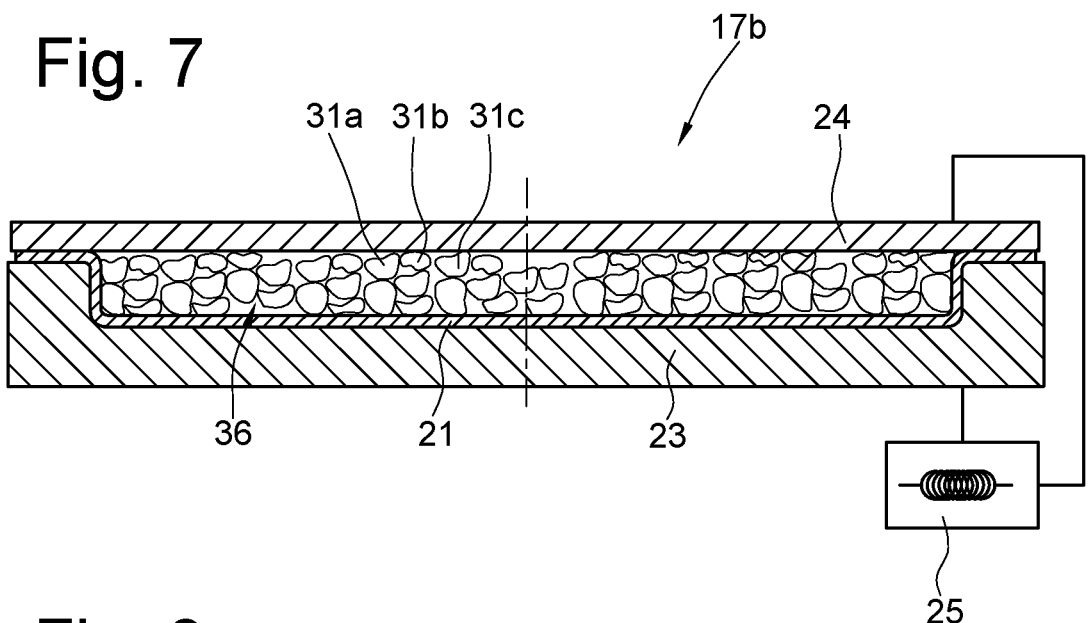
FIG. 7 shows the die of FIG. 6 in the fully closed state with a heating device for the die also illustrated.

FIG. 7 indicates a heater 25 that tempers the die 17b, preferably both lower die part 23 and upper die part 24. The mold temperature is selected according to the materials used for the particle foam.

Figure 8:
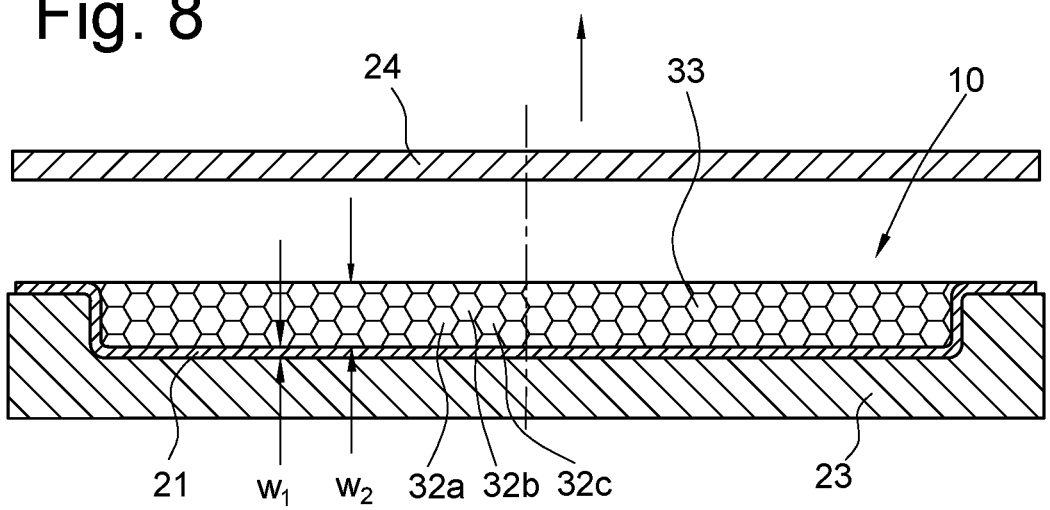
FIG. 8 shows the die of FIG. 7 in the open state with a finally expanded cured-particle foam mass.
Figure 11:
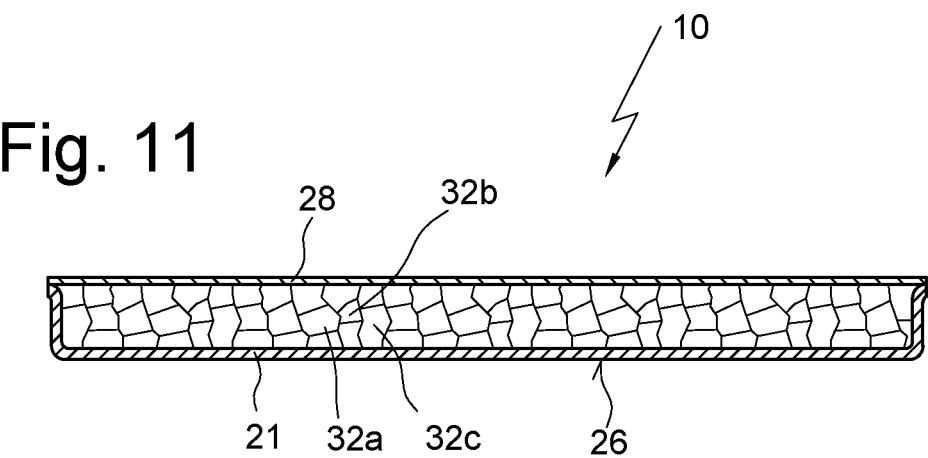
FIG. 11 shows a further embodiment of a construction element according to the invention in a representation according to FIG. 10 but where the pore structure of the cured-particle foam is illustrated in a modified manner with respect to FIG. 10 only for purposes of illustration.

As a result of the effect of temperature, the partly expanded particles 31a, 31b, 31c are completely expanded. A honeycomb structure can be seen, only indicated by way of example in FIG. 8. This is also to be understood only schematically: in fact, the structure of the completely expanded particle foam will be irregular. Another comparable structure is shown in FIG. 11:

Here, instead of the frame structure of FIG. 8, an irregular polygonal structure is shown in the schematic sectional representation.

FIG. 8 makes it clear that the partly expanded particles 31a, 31b, 31c according to FIG. 7 mutate to completely expanded particles 32a, 32b, 32c, wherein free spaces no longer remain between individual expanded particles 32a, 32b, 32c. FIG. 7 indicates such free spaces, exemplified by 36, on the other hand.

It should be noted that the term "fully expanded particles 32a, 32b, 32c" is misleading:

In fact, the multiplicity of completely expanded particles 32a, 32b, 32c together form a completely expanded particle foam mass 33 or a completely expanded particle foam. As can be seen from FIG. 8, this can cure within a short time, so that, as FIG. 8 indicates, the die is opened, and the upper die part 24 can be lifted off the lower die part 23. Now, the thus formed molded article 10 can be removed from the mold.

As a result of the process of final-expanding, when the die is closed, the particle foam permanently and firmly bonds to the inner side 35 of the deep-drawn film 21. As a result, a lightweight, rigid and stable and yet inexpensive to produce composite construction element is provided.

Figure 9:
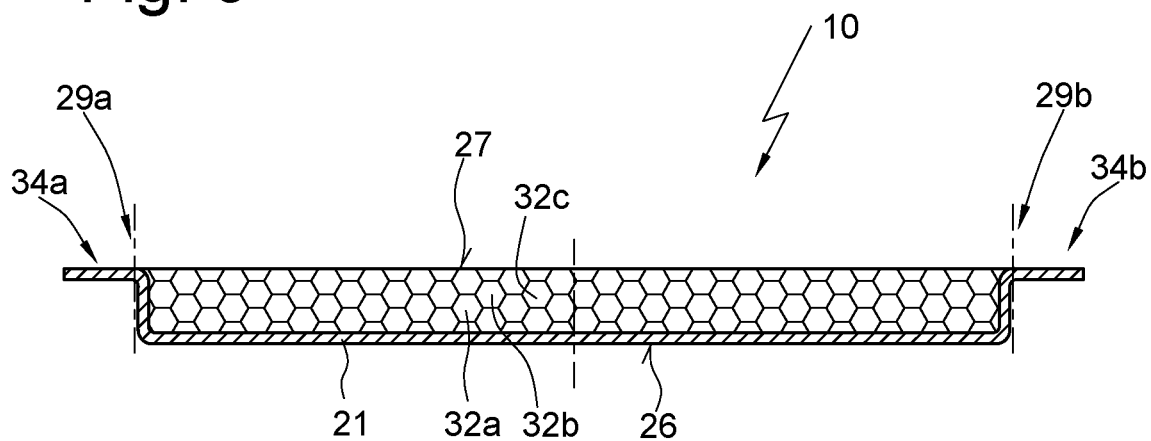
FIG. 9 shows the molded article removed from the die of FIG. 8 with separation lines along which projecting regions of the substrate are separated.

As shown in FIG. 9, if necessary, projecting regions 34a, 34b of the film 21 can have been separated along the separation lines 29a, 29b.

Figure 10:
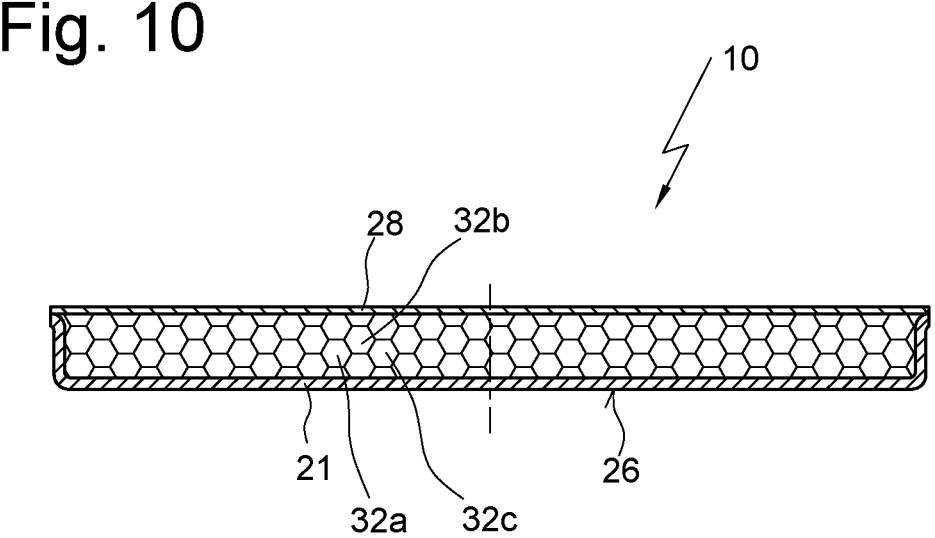
FIG. 10 shows a further embodiment of a molded article or a construction element according to the invention formed by the method according to the invention and having an additional layer on the side of the cured-particle foam mass facing away from the substrate.

The embodiment of FIG. 10 shows the back side 27 of the construction element 10 that can be provided with an additional layer 28, for example, plastic.

The invention also comprises construction elements in which, instead of a deep-drawn film 21 of ABS or PMMA, a thin film of polyethylene or polypropylene, or in particular also so-called slush skins, are used as the substrate 21.

The side 26 of the deep-drawn film 21 that faces away from the cured-particle foam mass 33, can form a high-quality surface. Since the provision of a deep-drawn film 21 can be made using conventional known and proven materials, the corresponding surface properties of the conventional materials can be used.

The invention also comprises when the surface 26 of the substrate 21 is subjected to a separate processing in order to provide a high-quality surface. For example, processing steps such as polishing, painting, steaming, roughening, wetting, etc. can be considered.

In FIG. 8, the wall thicknesses $W_1$ of the deep-drawn film 21 or of the substrate and $W_2$, namely the wall thickness of the cured-particle foam mass 33, are indicated by way of example. The wall thickness $W_1$ can be between 0.2 mm and 13 mm, and the wall thickness $W_2$ between 1 cm and 30 cm.

The invention particularly comprises construction elements that are configured as caravan wall elements. For example, wall sections of a caravan trailer or a caravan, or complete wall elements of a caravan, can be used in vehicle construction, using the method according to the invention.

The invention further comprises embodiments that provide that reinforcing elements are accommodated in the cavity 22 before filling the cavity 22 with partly expanded particles 31a, 31b, 31c.

The reinforcing elements not shown in the Figures can have, for example, reinforcing fibers. As a result of filling the cavity 22 with partly expanded particles 31a, 31b, 31c, the particles are equally distributed and surround the reinforcement elements on several sides, preferably on all sides. The finished manufactured construction element 10 comprises a cured-particle foam mass that encloses the reinforcing elements securely. In particular, tensile forces can be transmitted and intercepted by positioning the reinforcing elements.

The invention claimed is:

1. A method of making a thin construction element in sandwich lightweight construction and having a high-quality surface, the method comprising the following steps:
 a) providing a substrate film of PMMA or ABS having a thickness between 0.2 mm and 13 mm,
 b) deep-drawing the substrate film and placing the deep-drawn film into a cavity of a lower die part of a die such that bottom and side walls of the cavity are covered by the substrate film,
 c) providing granular starting material in the form of loose particles of an expandable particle foam,
 d) only partly expanding the particles outside the die,
 e) introducing the partly expanded particles into a the cavity of the lower die part on top of the deep-drawn substrate film in the cavity and fitting an upper die part to the lower die part to close the cavity on all sides,
 h) heating the lower part of the closed die with a heating device to a predetermined temperature with the cavity closed on all sides to conduct heat from the lower part through the substrate film to the partly expanded particles and thereby further expand the partly expanded particles into a completely expanded particle foam that bonds to the substrate film,
 i) curing the completely expanded particle foam in the closed die into a molded article, and
 j) opening the closed die and removing the molded article from the cavity of the die.

2. The method according to claim 1, further comprising the step of:
 k) after step c and before closing the cavity, applying a cover layer on a side of the partly expanded particles facing away from the substrate film.

3. The method according to claim 1, further comprising the step of:
 l) processing the molded article into a construction element.

4. The method according to claim 1, wherein the cured-particle foam has a wall thickness between 1 cm and 30 cm.

5. The method according to claim 1, wherein the construction element is configured as a vehicle part for a motor vehicle, a commercial vehicle, or a trailer, like an interior fitting part, cargo compartment cover, cladding part, engine hood, roof element or roof segment, vehicle wall, or vehicle wall element.

6. The method according to claim 1, wherein the expandable particle foam is of expandable polystyrene, polypropylene, or polyether ether ketone.

7. The method according to claim 1, wherein before step h), the following step is performed:
 m) positioning reinforcing elements as tie rods in the lower die part such that after the introduction of the partly expanded particles into the lower die part, the partly expanded particles surround the reinforcing elements.

8. A method of making a thin construction element in sandwich lightweight construction and having a high-quality surface, the method comprising the following steps:
 a) providing a substrate film of PMMA or ABS having a thickness between 0.2 mm and 13 mm,
 b) deep-drawing the substrate film and placing the deep-drawn film into a cavity of a lower die part of a die with the substrate film such that a bottom wall and side walls of the lower die part are covered by the substrate film,
 c) providing granular starting material in the form of loose particles of an expandable particle foam,
 d) only partly expanding the particles outside the die,
 e) introducing the partly expanded particles into the cavity of the lower die part on top of the deep-drawn substrate film,
 h) heating parts of the die with the cavity being closed on all sides with a heating device to a predetermined temperature to further expand the partly expanded particles into a completely expanded particle foam that bonds to the substrate film, the further expansion of the partly expanded particles being triggered by the predetermined temperature of the die,
 i) curing the completely expanded particle foam to cure in the die into a molded article, and
 j) opening the die and removing the molded article from the cavity of the die.

* * * * *